US006512652B1

(12) United States Patent
Nelson et al.

(10) Patent No.: US 6,512,652 B1
(45) Date of Patent: Jan. 28, 2003

(54) POWER SAVING METHOD AND APPARATUS FOR COMPUTER DISK DRIVES

(75) Inventors: Dwight Quentin Nelson, Tucson, AZ (US); Daniel James Winarski, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 1535 days.

(21) Appl. No.: 08/608,974

(22) Filed: Feb. 29, 1996

Related U.S. Application Data

(63) Continuation of application No. 08/253,650, filed on Jun. 3, 1994, now abandoned.

(51) Int. Cl.⁷ ................................................ G11B 5/55
(52) U.S. Cl. .................................................... 360/78.01
(58) Field of Search .............................. 360/73.03, 69, 360/74.1, 75; 369/54

(56) References Cited

U.S. PATENT DOCUMENTS

| | | | |
|---|---|---|---|
| 4,658,308 A | | 4/1987 | Sander, Jr. .................. 360/74.1 |
| 4,689,698 A | * | 8/1987 | Ishikawa et al. ............ 360/74.1 |

(List continued on next page.)

FOREIGN PATENT DOCUMENTS

| | | | | |
|---|---|---|---|---|
| JP | 60-171672 | * | 6/1985 | .............. 360/73.03 |
| JP | 62129971 | * | 6/1987 | |
| JP | 362374 | * | 3/1991 | |
| JP | 6-124528 | | 5/1994 | |
| JP | 7-272387 | | 10/1995 | |

OTHER PUBLICATIONS

Disk Drive Controller for Magnetic Recording and Reproducing Device, Patent Abstracts of Japan, vol. 11, No. 350, Jun. 12, 1987.* hard disk Controller, Patent Abstracts of Japan, vol. 15, No. 220, Mar. 18, 1991.*

*Primary Examiner*—David Hudspeth
*Assistant Examiner*—K. Wong
(74) *Attorney, Agent, or Firm*—Dan Hubert & Assoc.

(57) ABSTRACT

A power saving method and apparatus while maintaining an operational or near-operational state for computer memory disk drives. A microprocessor implements microcode instructions to determine if a disk drive is inactive. This is done by checking a control unit through an interface to see if any files are currently opened or data is being transferred by the disk device. If no files are opened and/or no data transfers are occurring, the drive is considered inactive. If the inactive period continues for a period of time which is greater than a predetermined reference activity level, then actions are taken to reduce the rotational velocity of the drive spindle motor to its lowest operational level, or just below the lowest operational level without stopping the disk. The spindle motor is accessed by the microprocessor through a spindle motor control unit. In the case of a constant linear velocity disk drive, the spindle motor is indirectly controlled by the microprocessor sending a message to an actuator to move a data head to a track that is near the outer periphery of the disk medium. In order to maintain a constant linear velocity, the spindle control slows the angular velocity of the motor resulting in a reduction of power consumed. When it is necessary to access data again, the drive enters an active state and the head is moved by a microprocessor "seek" command. In the case of a constant angular velocity disk drive having selectable speeds, the microprocessor controls the motor speed directly. The microprocessor, upon determining that the disk has been inactive for a predetermined threshold period, selects a constant speed that is the lowest operation speed available. This results in a power saving mode being implemented for the disk drive The drive is returned to normal operational speed by a microprocessor "seek" command. For further savings, the motor is stopped or "spun down" when left inactive for a longer period of time.

30 Claims, 7 Drawing Sheets

U.S. PATENT DOCUMENTS

| | | | |
|---|---|---|---|
| 4,717,968 A | * | 1/1988 | Painton et al. .............. 360/74.1 |
| 4,737,867 A | * | 4/1988 | Ishikawa et al. ............... 360/69 |
| 4,783,706 A | | 11/1988 | Shoji et al. ................... 360/78 |
| 4,789,975 A | * | 12/1988 | Taniyama ................ 360/73.03 |
| 4,933,785 A | * | 6/1990 | Morehouse et al. ..... 360/78.04 |
| 4,987,502 A | | 1/1991 | Freeze ......................... 360/75 |
| 5,050,015 A | | 9/1991 | Hack et al. ................... 360/75 |
| 5,117,315 A | | 5/1992 | Nagasaki et al. .............. 360/71 |
| 5,197,055 A | | 3/1993 | Hartung et al. ................ 369/34 |
| 5,246,479 A | * | 9/1993 | Gami et al. ............... 360/73.03 |
| 5,283,702 A | | 2/1994 | Tsuyuguchi et al. .......... 360/75 |
| 5,345,347 A | * | 9/1994 | Hopkins et al. .............. 360/75 |
| 5,408,369 A | * | 4/1995 | Miura et al. .............. 360/69 X |

\* cited by examiner

POWER SAVING METHOD AND APPARATUS FOR COMPUTER DISK DRIVES

This application is a continuation of application Ser. No. 08/253,650, filed Jun. 3, 1994, now abandoned.

BACKGROUND OF THE INVENTION

1. Field of the Invention

The present invention relates to computer memory disk devices in which the speed of rotation is controlled, and particularly to reducing power consumption of multi-speed constant linear velocity and multi-speed constant angular velocity disk drives.

2. Description of the Related Art

It is known that reducing power consumption of computers and their peripherals promotes energy conservation. Further, it has been recognized that reducing power consumption of computer components and peripherals decreases the size of a power supply needed for this function. A smaller power supply facilitates the use of convenient portable computers, e.g., laptop and notebook computers. Thus, it is desirable to reduce the power required by computer peripherals in order to save energy and increase the convenience of computers.

It is known to reduce the voltage supplied to the head transport motor of a computer disk when no recording medium is loaded in the disk drive. U.S. Pat. No. 4,783,706 to Shoji et al. discloses such an arrangement. However, when a recording medium is in the disk drive then no power can be saved by using this method.

It is also known to "spin down", i.e. stop spinning, a recording media when a disk drive has been inactive for a predetermined period of time. This results in a power savings, since the disk is idle. Such a method is shown in U.S. Pat. No. 5,197,055 to Hartung et al. However, a significant time delay is experienced when it is necessary to "spin up" the disk to reach operational rotational speed.

It is disclosed in U.S. Pat. No. 4,987,502 to Freeze, that random selection of successive disk tracks can be used to distribute head contact wear. The system counts idle periods in order to determine when to move the head. After a predetermined maximum number of idle periods has been reached the system employs a controller to stop the rotation of the disk. Stopping the rotation of the disk has the same effect on power consumption as the "spin down" method of the '055 patent discussed above. Additionally, the disadvantage of a significant time delay to reach operational speed after stopping is also present when using the method disclosed in the '502 patent.

Similar methods and arrangements for displacing the head to reduce wear are disclosed in U.S. Pat. No. 5,050,015 to Hack et al. and U.S. Pat. No. 5,117,315 to Nagasaki et al. The '015 patent discloses moving the head to a waiting track or area outside the usable area of the magnetic tracks. The track location and waiting time are dependent on which tracks are read most frequently, since the objective of the '015 patent disclosure is to reduce wear. A control circuit is stopped and started to achieve the displacement. Unfortunately, the stopping and starting of the electronic control circuit involves more power consumption. The '315 patent discloses displacing the head when a processor detects presence or absence of rotation in the disk. The system is capable of reducing wear by slightly displacing the head two or three tracks and lifting the head when the disk is started. Power is saved by reducing the drag effect of the head inadvertently contracting the disk or start-up; however, the apparatus and method are not useful to save power when a disk is already in motion.

U.S. Pat. No. 4,658,308 to Sander discloses a method and apparatus for moving a head to a safe "home" position under microprocessor control when it is sensed that power to a rotating disk is to be interrupted. Slight savings in power are probably realized by reducing any inadvertent drag effects that would result if the head interfered with the disk rotation. However, the method and apparatus are ineffective to save power while a disk is spinning in a useful operation.

SUMMARY OF THE INVENTION

An objective of the present invention is to reduce the power consumption of an optical disk device without significantly degrading response time to a command to seek data.

Another objective of the present invention is to provide an apparatus and method for reducing power consumption that does not require removing a disk from the optical disk device.

The present invention is based on the inventors' critical observation that power consumption can be reduced in an optical disk drive by determining when a period of inactivity occurs, and then issuing a command to reduce the velocity of the spindle motor which spins the disk medium to the lowest "operational level" or just below the operational level, without completely stopping or "spinning down" the disk for the duration of the inactive period. The "operational level" refers to that angular velocity where the head may still read or write data.

In a constant linear velocity (CLV) disk drive, a signal is issued from a microprocessor to an actuator to cause a head having read capability to seek to an outer track when a predetermined period of inactivity occurs. This is advantageous because the angular velocity of the disk medium is less at the outer periphery for a given constant linear velocity (the speed measured under the head), and therefore the power consumption of the spindle motor which spins the disk will be less.

In a constant angular velocity (CAV) disk drive a reduction of the rotational speed during a period of relative inactivity is accomplished by issuing a control signal from the microprocessor to the spindle control module to reduce the angular velocity of the spindle motor that spins the disk to the lowest operational level or just below the operational level without completely "spinning down" the disk for the duration of the inactive period.

Advantageously, in either embodiment, the disk is operational, as it is never completely "spun down" to the point that it stops rotating, with an exception for disks left inactive for large periods of time. So there is no associated significant delay in "spinning up" the disk upon receiving an I/O command. Thus, the invention can be used to reduce power consumption of a disk spindle motor while maintaining the disk in an operational mode, or spinning at a speed just below an operational mode. Regarding the mentioned exception, if the disk is left inactive for a predetermined time which is significantly long the disk may be stopped from spinning. The stopping of the disk, according to the present invention, will only follow the event of either moving the head to an outer track for CLV drives, or reducing the angular velocity to the lowest selectable speed for multi-speed CLV and multi-speed CAV drives.

DETAILED DESCRIPTION OF THE PREFERRED EMBODIMENTS

Principles of Operation

Certain principles of electrical engineering, related to disk drives, and in particular direct current (DC) motors useful for spinning disk mediums are helpful in understanding the present invention.

It is well known that Ohm's law teaches that voltage (V) is equal to current (I) times resistance (R) of a motor, or V=I*R. Further it is known that power (P) of the motor is given by the relationship $P=V*I=V^2/R$. It is also known that voltage of a particular motor is related to its angular velocity by the following equation:

$$V=Ke*\omega$$

where Ke is a motor voltage constant dependent on the characteristics of a certain motor type, and $\omega$ is the angular velocity of the motor, thus yielding the following helpful relationship:

$$P=Ke^{2}*\omega^2/R$$

Thus it has been recognized by the inventors that because the power expended by a motor drops as the angular velocity of the motor drops it is desirable to employ a method and apparatus for automatically taking advantage of this relationship.

Embodiments

Figure 1:
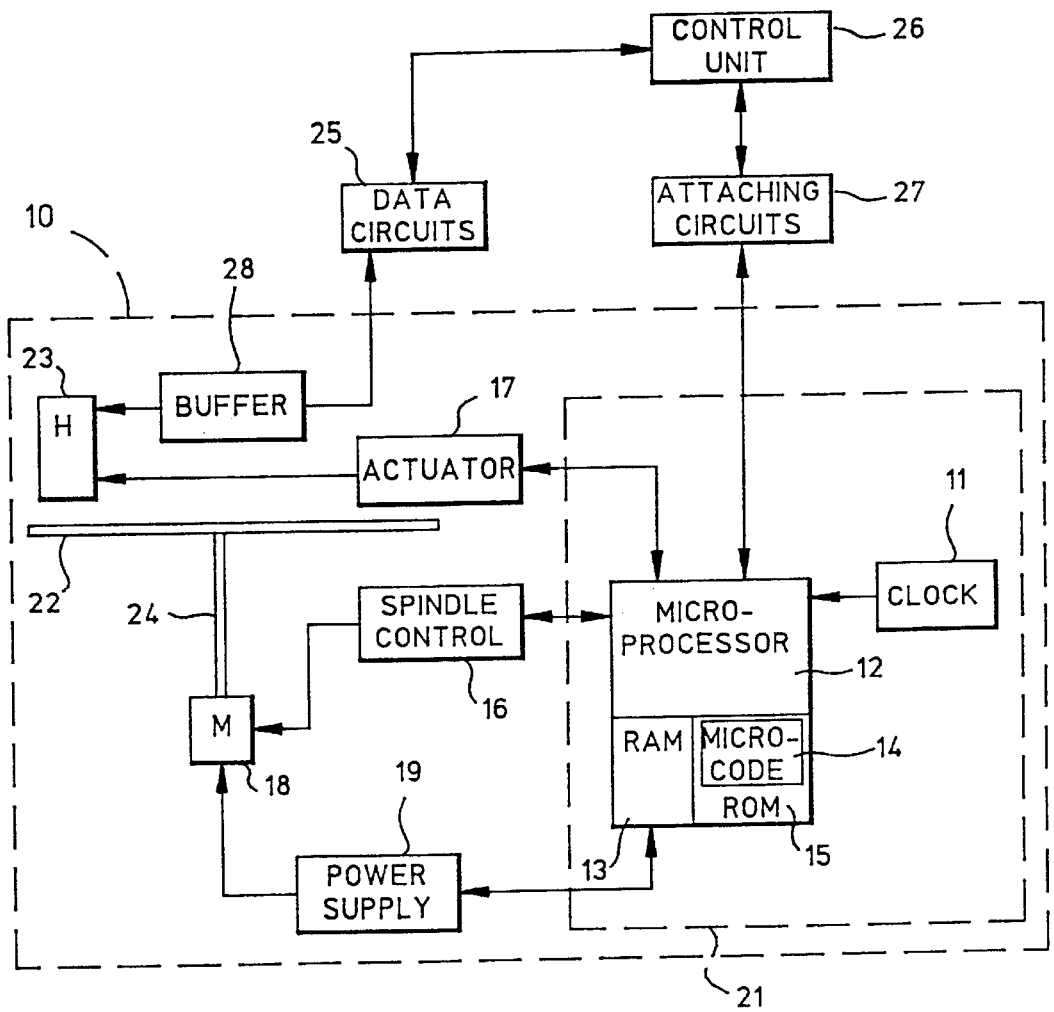
FIG. 1 is a block diagram of the present invention.

Referring to FIG. 1, a general block diagram of an apparatus capable of reducing the power consumed by a disk drive 10 is shown. An optical disk drive is the preferred embodiment; however, the teachings of the present invention are also useful with non-optical disk devices, such as direct access storage devices. The invention is particularly useful in those disk devices employing constant linear velocity (CLV) and constant angular velocity (CAV) control schemes. Thus, disk drive 10 could be either of the CLV or CAV type. The invention is also useful with a particular type of CAV disk drive referred to as Zoned Constant Angular Velocity (ZCAV). ZCAV disk drives are CAV drives where the linear density of the recorded data increases incrementally with radius. Microprocessor 12 has its own memory, such as random access memory 13 and read only memory 15, which is used to store commands and for accomplishing tasks such as "power on" tests. This memory is used to store microcode 14, which is a set of preprogrammed instructions for carrying out microprocessor functions. Preferably, the inventors envision implementing instructions in microcode within a microprocessor that is part of the disk drive, such as microcode 14 shown as part of microprocessor 12, which is dedicated to disk drive 10. It is recognized that applicable instructions could be implemented in other ways, including as an application program written in, for example, the "C" language and operating in control unit 26 which interfaces to disk drive 10 through attaching circuits 27. However, it is believed that is more efficient to implement instructions directly in the microprocessor because the length of the data path of the instructions is kept to a minimum. The instruction set depends on the particular microprocessor. Several popular microprocessors used with computers and computer peripherals are made by the Intel Corporation, although those from other manufacturers, such as Motorola are also available and are commonly used for similar tasks. For example, reference may be made to the following documentation for more in-depth understanding of programming an Intel microprocessor: Intel, *Microprocessor Peripheral Handbook*, Vol. 1, and J. Crawford and P. Gelsinger, *Programming the 80386*.

Figure 2:
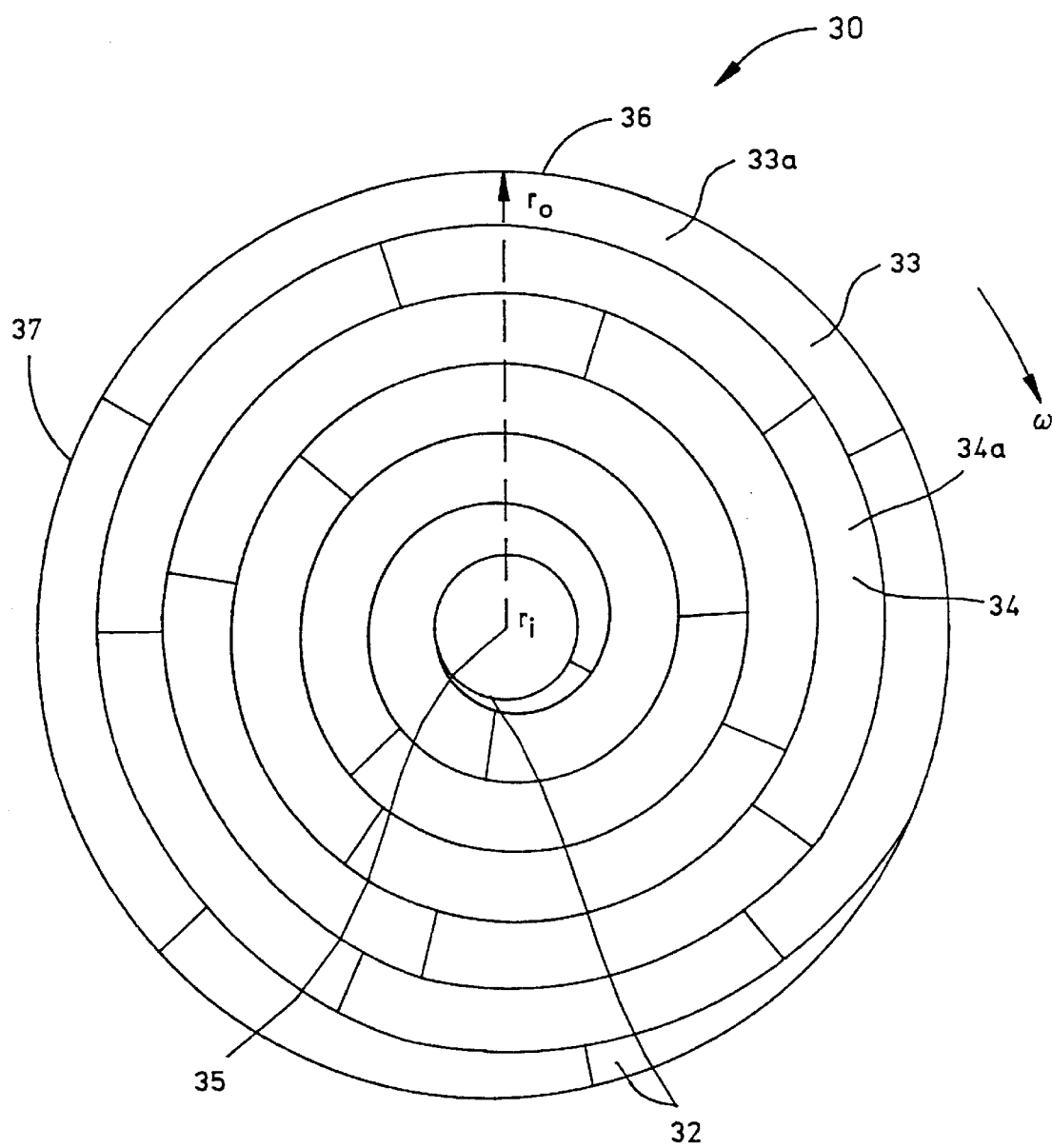
FIG. 2 shows a disk medium useful with constant linear velocity type disk drives.

Again referring to FIGS. 1 and 2, the microprocessor 12 communicates with a control unit 26, which may be a personal computer microprocessor, through attaching circuits 27, which may be for example a Small Computer Systems Interface (SCSI) card. The microprocessor 12 controls a spindle control module 16 which controls the spindle motor 18 which receives power from power supply 19. The spindle motor has a rotating element 24 and a disk platter 22 for accommodating and spinning a disk medium, such as disk 30 (FIG. 2). The microprocessor also controls an actuator 17 which through a known mechanism controls movement of data read head 23. Data read from the head is passed through buffer 28 and data circuits 25 to the control unit 26. The spindle control module 16 and actuator 17 are controlled by microcode 14 in microprocessor 15 according to whether the apparatus is programmed to accommodate constant linear velocity or constant angular velocity schemes. The microprocessor 12, containing microcode 14, and including the microprocessor's on board RAM 13 and ROM 15 and a clock 11, form a power savings module 21 for disk drive 10.

Constant Linear Velocity

One embodiment of the present invention can be employed with known constant linear velocity disk drives. In a constant linear velocity optical disk drive, such as a CD-ROM (Compact Disc-Read Only Memory), a laser head is used as the velocity transducer. Referring to FIG. 2, a CD-ROM disk 30 employs a single path 32 forming approximately concentric circles, such as circles 33 and 34. The single path spirals from the center 35 of the disk 30 to its outer periphery 36. A sector 37, containing data, is logically and physically the same size as all the other sectors on the disk. Although there is actually only one path, each approximately concentric circle is referred to as a track. A phantom radial line "r" is shown extending from the center 35 to the outer periphery 36. Points $r_i$ and $r_o$ on the radial line r correspond to an inner radius, starting near the center of the disk, and an outer radius, measured near or at the outer periphery, respectively. The angular velocity of the disk, $\omega$, is equal to the angular velocity of a spindle motor which turns it. Track 33a and 34a correspond to circles 33 and 34, respectively. Thus, track 33a is the track closest to the outer periphery of disk 30.

Figure 3A:
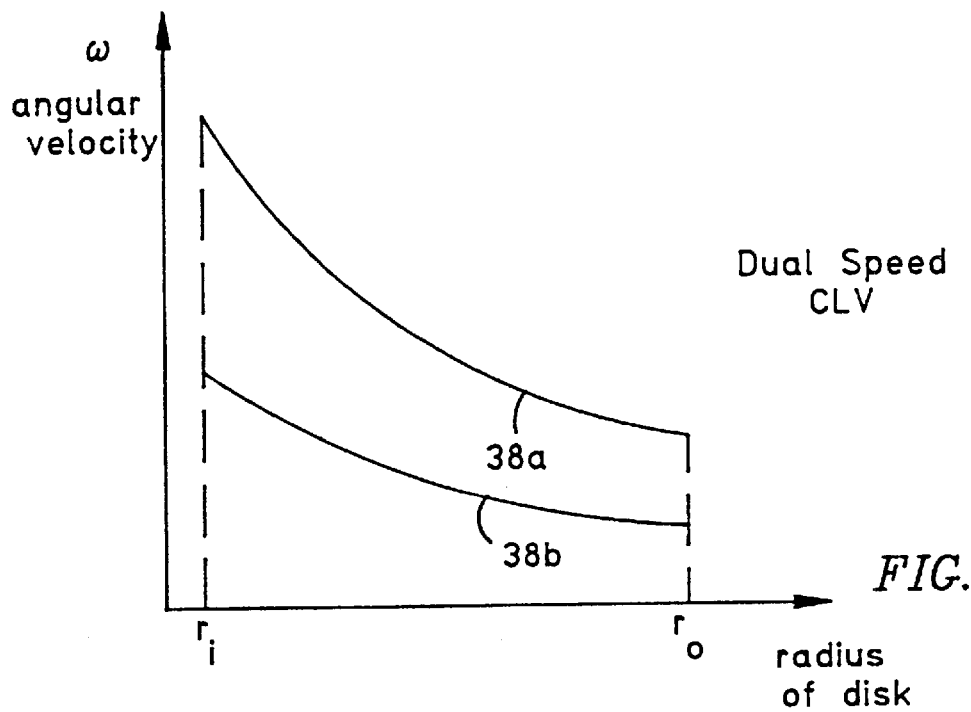
FIG. 3A is a graph illustrating a critical relationship useful with the present invention.

Referring to FIGS. 2 and 3A, a critical relationship of the radius of a disk to the power consumed by the motor using a CLV disk drive can be better understood. Using a constant linear velocity method, a disk drive (e.g. drive 10) constantly varies the rate at which a disk (e.g. disk 30) is spinning so that as a data reading head (e.g. head 23) moves over a portion of the disk, the speed measured at the head is held constant. This speed, $V_{Data}$, is actually the speed of the media being read by the head. $V_{Data}$ can also be varied for multi-speed devices; however, once a speed is selected the $V_{Data}$ is held constant as the angular velocity changes. The kinematic, or rotational dynamic relationship is known by the equation:

$$V_{Data} = r * \omega,$$

where r is the radius of the disk and $V_{Data}$ is the tangential (i.e. in a direction perpendicular to both the normal axis of rotation and the radius) velocity of the data measured at the head, and ω is angular velocity, typically measured in rotations per minute (RPM). For a given constant linear velocity, $V_{Data}$, the corresponding angular velocity must drop in order to obey the given relationship as the radius increases from the center of the disk to the outer periphery of the disk. FIG. 3A is a graph plotting angular velocities versus the radius in a multi-speed drive employing a constant linear velocity scheme, to illustrate this point. The points $r_i$ and $r_o$ correspond to the radial line "r" of FIG. 2. A top curve 38a, shown in FIG. 3A, plots the inverse relationship of the angular velocity, ω, to the increasing radius at the higher speed setting of a multi-speed CLV drive. A lower curve 38b plots the identical relationship, but at lower magnitudes, for a lower speed setting on a multi-speed CLV drive. This relationship can be related to power consumption, since it is known that $$P = Ke^2 * \omega^2 R,$$

it can be seen that $$P = \frac{Ke^2 * V_{Data}^2}{r^2 * R}$$

The inventors having recognized that this principal may be implemented to reduce power consumption in a disk drive, have invented an automatic method and apparatus to take advantage of the fact that an increase of the radius r to its maximum value reduces the angular velocity and thus the power consumption of the spindle motor in a constant linear velocity disk drive, while leaving the disk drive "operational" or at a speed close to "operational" speed. An operational speed or level is that disk speed at which the head may read or write data to the disk.

Figure 4:
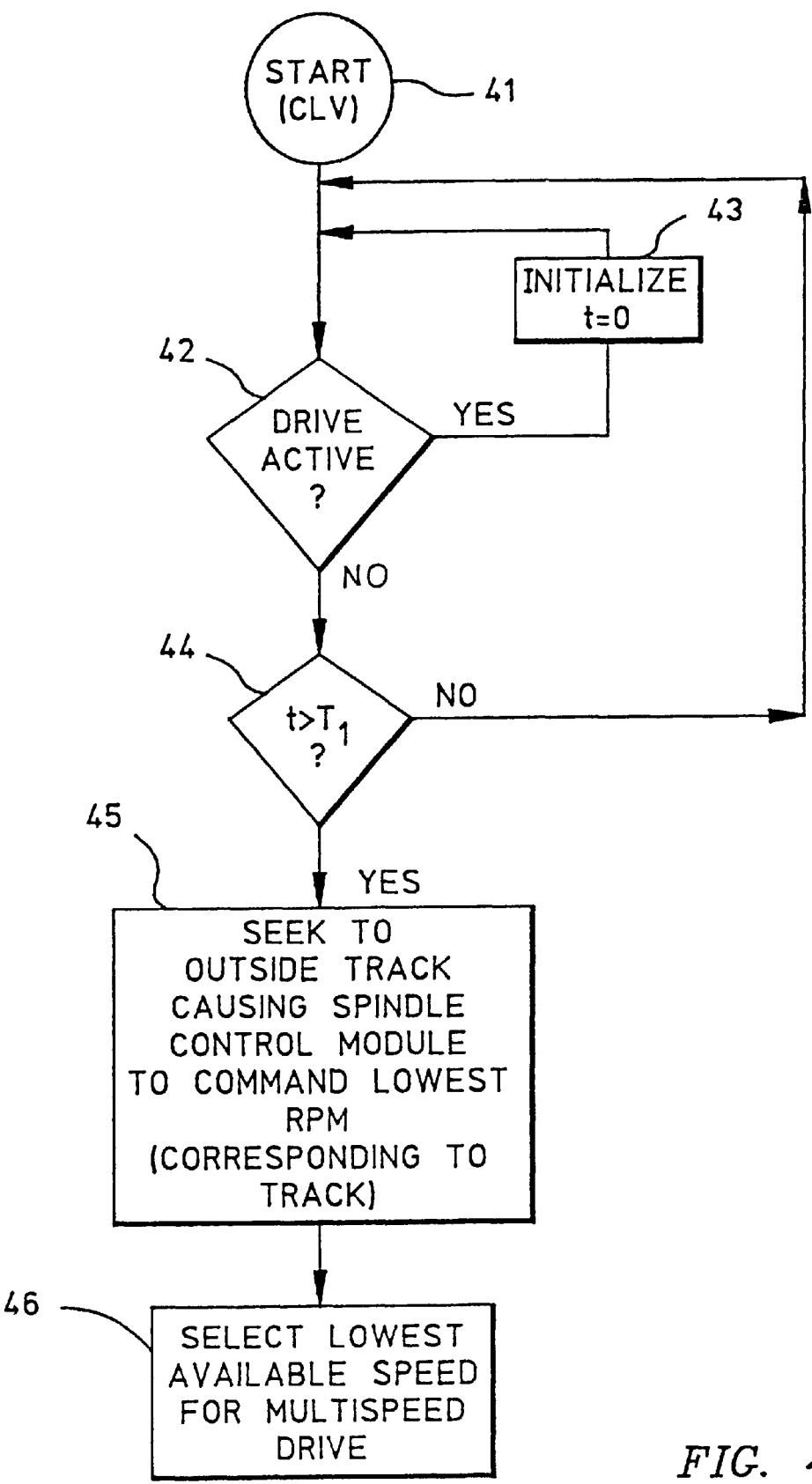
FIG. 4 is a flow chart of one embodiment of the present invention.

Referring to FIGS. 1 and 4, the preferred implementation of the invention may best be understood. An overview of the instructions is included in the flow chart shown in FIG. 4. In each step the microprocessor 12 implements microcode instructions in order to carry out the process; however, for the sake of simplicity, reference will be made only to the microprocessor since it is the principal actor. The microprocessor 12 "Start" step 41 coincides with the "powering on" of the disk drive. A "Drive Active" check step 42 is performed by the microprocessor 12 to see if any data is being transferred between the head 23 and disk or between the drive buffer 28 and data circuits 25. Alternately, step 42 is performed by control unit 26 to see if any files are currently open (i.e., being read or having data written to them). If this is true, then the drive is considered to be "active" and a time clock 11 used to measure periods of "inactivity" is reset to zero in step 43. The step 42 is performed continuously until all activity ceases, and when this condition is met the drive is considered "inactive." Next the processor checks the clock 11, to determine if a predetermined time, $T_1$, has passed while the drive remains inactive (step 44). During this "inactive" time, the drive is still checked for activity. Once a predetermined time has passed, with the drive inactive, then it can be established that the drive "activity level" is below a predetermined reference activity level. Thus, after the clock time, t, measured at clock 11, has exceeded a predetermined time, $T_1$, while the drive is in an inactive state, the microprocessor 12 sends disk drive 10 into a power saving mode (step 45). The inventors recognize that it is also possible to cause the power saving mode to occur if a measured time, t, is less than a predetermined time, $T_1$, without deviating from the spirit of the invention.

Referring to FIGS. 1, 2, 3A and 4, in a constant linear velocity disk drive, a message is sent from microprocessor 12 to actuator 17 to cause head 23 to seek to the track 33a, which has the maximum radius measured from disk center 35 (step 45 of FIG. 4). The spindle control module 16, automatically configured to maintain a constant linear velocity ($V_{Data}$) compensates by decreasing the angular velocity of spindle motor 18 to the lowest operational level of FIG. 3A (where the horizonal coordinate is $r_o$), as shown in step 45. Thus, given the previously described relationship which mandates a decrease of power when the radius is increased and the angular velocity is decreased, it can be seen that the power savings are significant. The significance is especially recognizable when it is noted that the power is inversely proportional to the radius squared. Additional power savings are recognized by microprocessor 12 then commanding the spindle control module 16 to select the lowest available speed for a multi-speed drive (step 46). For a CLV drive at its low RPM, which occurs when the head is at the outer track (e.g., track 33a) a simple "seek" command issued by microprocessor 12, is all that is required to access data located elsewhere on the disk. Although a speed change is associated with the CLV seek, such a change is associated with every "seek" implementation in a CLV device. Thus, the drive is still fully operational in the power saving mode. It is advantageous that the disk is rotating at a reduced speed when inactive, rather than being "spun down" (i.e., at rest), because a completely spun down disk takes a significant amount of time to be "spun up" to operating speed. Of course, the disk may be spun to a level just below operational without stopping in order to save power without departing from the spirit of the invention.

Constant Angular Velocity

Figure 3B:
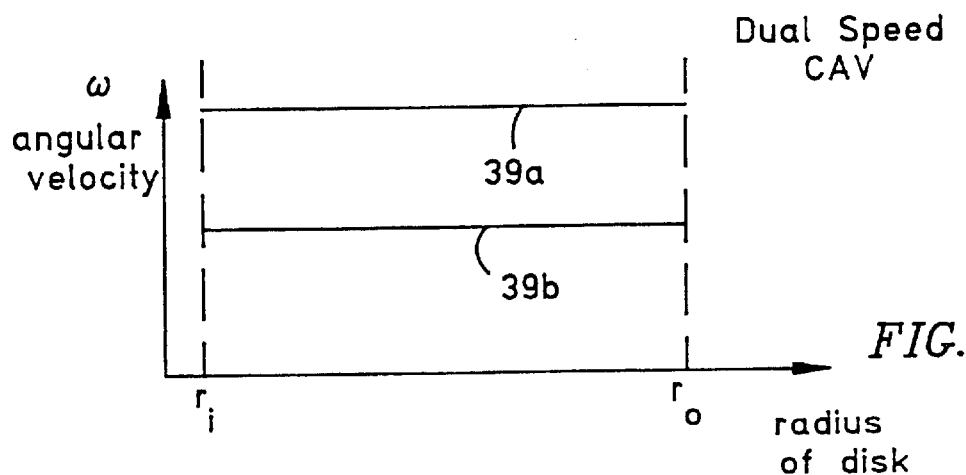
FIG. 3B is a graph illustrating another critical relationship useful with the present invention.

Referring to FIGS. 1 and 3B, another embodiment of the present invention can be employed with disks for constant angular velocity (CAV) schemes. Multi-speed constant angular velocity (CAV) schemes are well known. Typically a spindle motor, such as motor 18, is used as a velocity transducer by attaching a tachometer to the motor's rotating element (such as element 24) and then digitally encoding the signal. Alternatively, a signal from a motor is compared to a reference signal to determine the rotational or angular velocity of the spindle motor. Once the velocity of the motor is known, it can be controlled by varying the voltage applied to the motor, through a power supply 19 controlled by microprocessor 12. The result is shown in FIG. 3B, a constant angular velocity is maintained regardless of where a head, such as head 23, is in relation to the radius, which is shown to increase from an inner value "$r_1$", near the center, to an outer value "$r_0$", near or at the outer periphery. The top line 39a represents a higher speed setting for a CAV drive, and the lower line 39b represents a lower speed setting for a CAV drive. In either case the angular velocity remains at the same value regardless of the radius at which the head is currently located.

Figure 5:
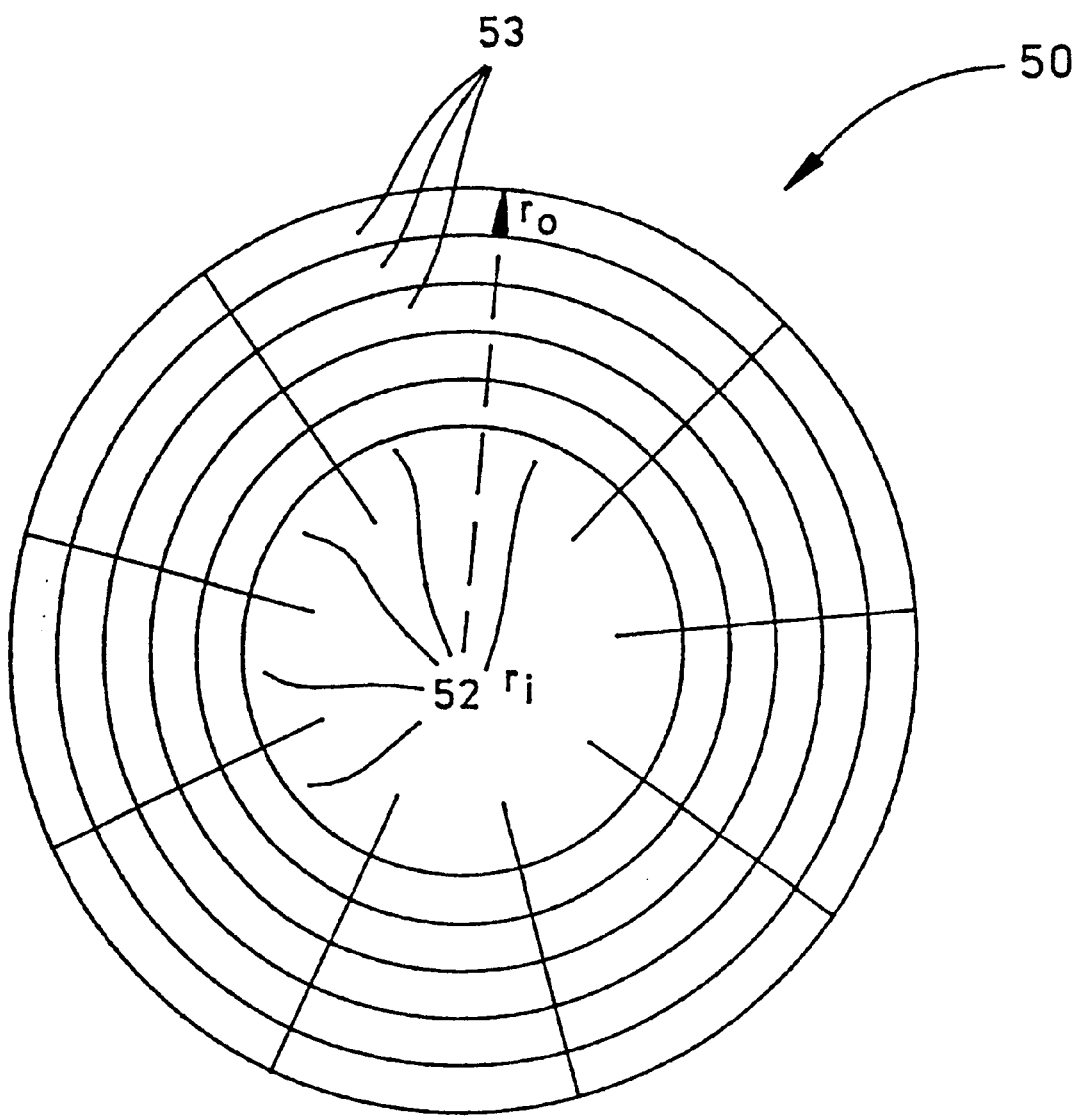
FIG. 5 shows a disk medium useful with constant angular velocity type disk drives.

Referring to FIG. 5, a known type of disk 50, which is useful with a CAV disk device is shown. Concentric circles form tracks 53, which are divided radially into sectors 52. The disk is controlled by a servo or other type of control module (such as module 16) to always spin at the same rate. The disk is typically a magnetic or optical type. Such CAV devices typically allow for automatic selection of a desired speed, for example a high speed might be 3600 RPM and a low speed might be 2400 RPM.

An example of power savings has been measured by the inventors and is illustrated in the table below, where the angular velocity is measured in Rotations per minute, or RPMs:

| RPM | Current (Amps) | Power |
|---|---|---|
| 2400 | 0.52 A | 6.2 Watts |
| 3600 | 0.60 A | 7.2 Watts |

The experimental set-up included a Hewlett-Packard C1716T CAV optical disk drive, and a Tektronix AM503 current probe, spun at the indicated RPM values. The voltage applied to the motor was 12 Volts DC, and wattage was calculated using Ohm's law. It can be seen that the reduction in RPM values results in a savings of about 16% ((7.2–6.2)/6.2).

In this case, it can be seen from the table above, that a savings of about 16% may be obtained by operating at a lower speed. Of course the trade-off is that access time of data is inherently slower with a slower spin rate. Thus, applying the same general concept as given above for constant linear velocity disks, the inventors have recognized that monitoring the activity level of the drive and comparing this to a reference activity level criteria allows for automatic reduction of the speed when there is a period of inactivity exceeding a predetermined time. The "active" versus "inactive" status is determined by the I/O activity monitored by drive microprocessor 12 or whether files are opened, as monitored by control unit 26.

Figure 6:
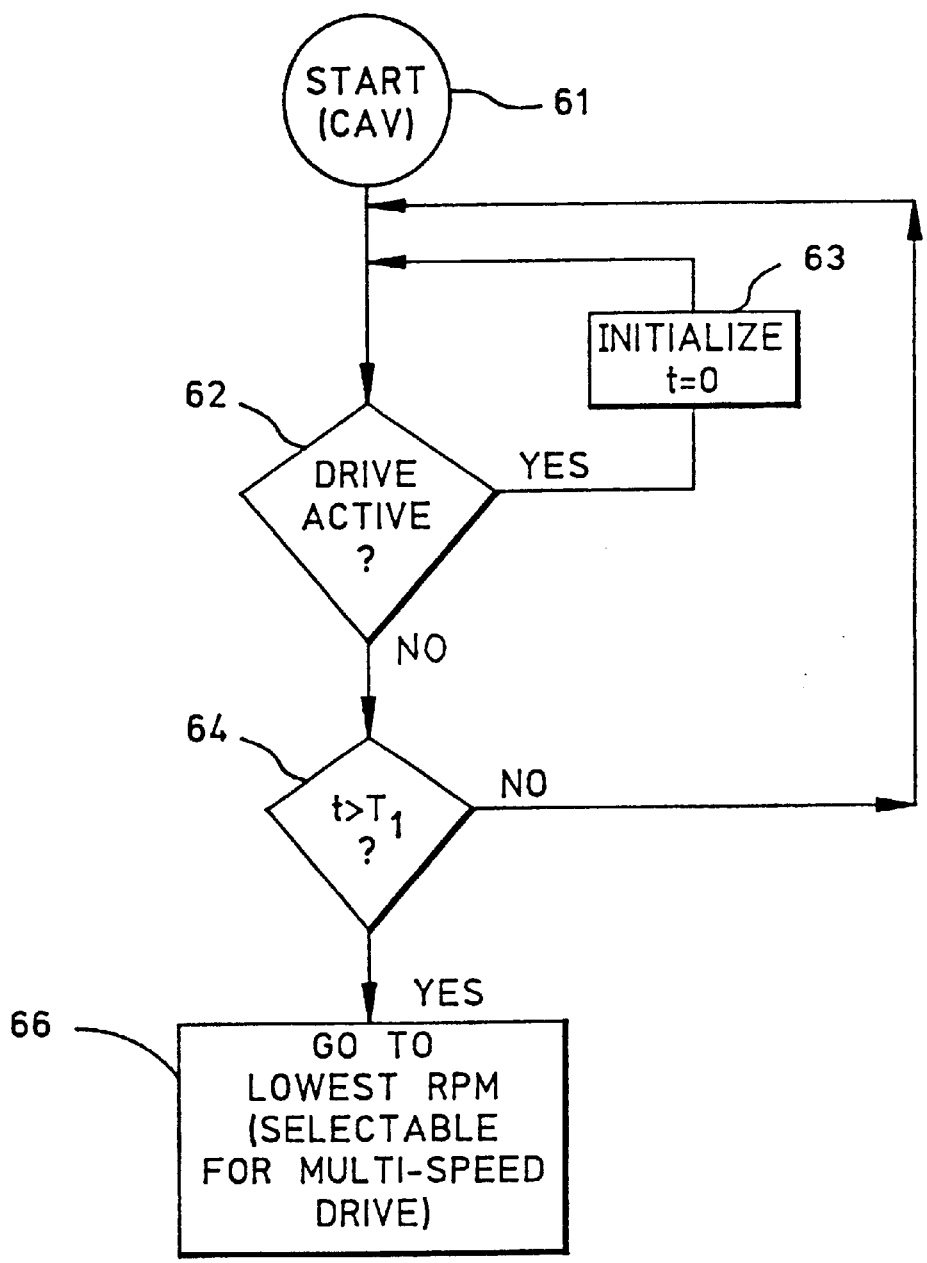
FIG. 6 is a flow chart of another embodiment of the present invention.

Referring to FIGS. 6 and 1, the embodiment of the invention using CAV disks is illustrated. As with CLV drives, in each step the microprocessor 12 implements microcode 14 in order to carry out the process; however, for the sake of simplicity, reference will be made only to the microprocessor action of carrying out the microcode instructions. The microprocessor 12 "Start" step 61 coincides with the powering on of the disk drive. As with CLV drives, a "Drive Active" check step 62 is performed by the microprocessor 12 to see if data I/O is occurring or if any files are currently open (i.e., being read or having data written to them). If any files are open, then the drive is considered to be "active" and a time counter, t, measured at clock 11, is reset to zero in step 63. Step 62 is performed continuously until all data transfer ceases or all files are closed, and when this condition is met the drive is considered "inactive." Next the processor checks the clock 11, to determine if a predetermined time has passed while the drive remains inactive. As with CLV devices, once a predetermined time has passed in step 64, with the drive inactive, then it can be established that the drive "activity level" is below a predetermined reference activity level. Thus, after the clock time, t, measured at clock 11, has exceeded a predetermined time, $T_1$, while the drive is in an inactive state, the microprocessor 12 goes into a power saving mode by reducing the disk angular velocity to the lowest operational speed, as shown in step 66.

Figure 7:
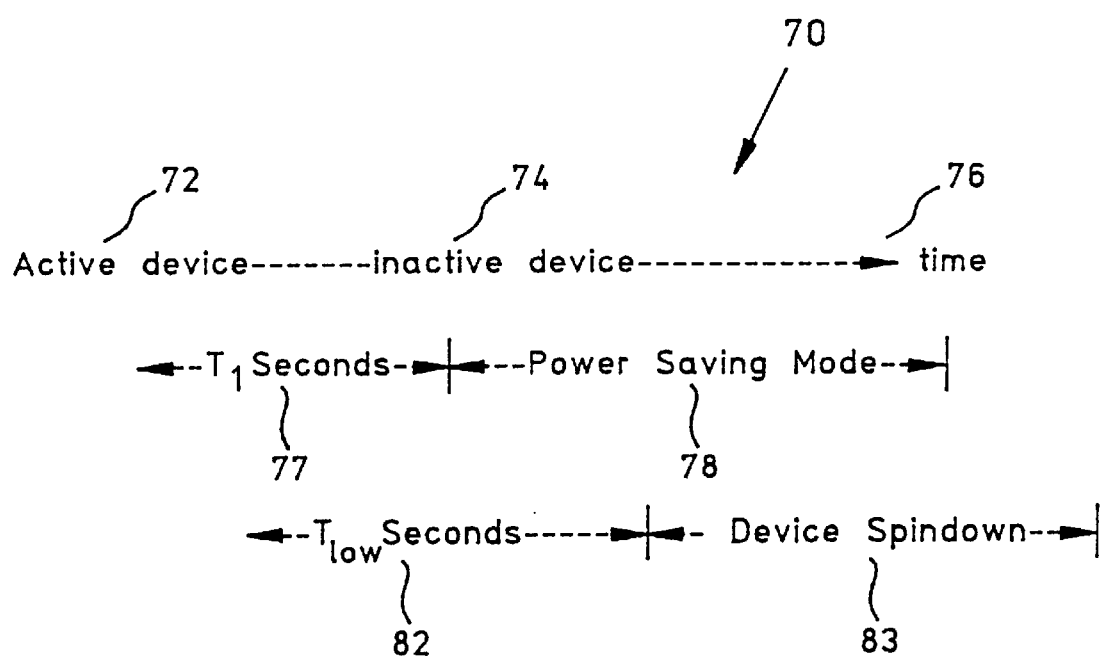
FIG. 7 is a diagrammatic timeline showing a sequence of actions useful for understanding the present invention.

Reference will now be made to FIGS. 4, 6, and 7. Referring to FIG. 7, a time line 70, where time is measured in direction 76, shows that a complete device spin-down can be added to the general method of power saving mode described above for either CLV or CAV schemes if the device has been in a power saving mode for a predetermined period of time. This might be implemented, for example, if a computer which uses the disk drive has been left powered on, but is unattended. A device is determined to be an active device as shown in time line segment 72 (segment 72). An active device is determined as described above in either step 42 FIG. 4 or step 62 FIG. 6. A device or drive which is inactive (segment 74) for $T_1$ seconds (segment 77) is sent into a power saving mode (segment 78) where it remains for $T_{LOW}$ seconds (segment 82), and then the motor velocity is reduced until the motor stops spinning (segment 83). In this way, a method and apparatus for saving power in a normal operation mode is combined with an additional savings technique for disks left inactive for a long period of time. Such a method, in a preferred embodiment, would be carried out by a microprocessor such as microprocessor 12, by instructions in microcode, such as microcode 14. Control unit 26 could also be programmed to perform the method. When the device is needed it can be spun back up to operating speed.

A preferred embodiment of the present invention has been described for reducing power consumption of a disk drive, without significantly slowing the access speed of data on the disk; however, it should be understood that modifications and adaption thereof may occur to persons skilled in the art. Therefore, protection afforded the present invention should only be limited in accordance with the scope of the following claims.

We claim:

1. A method of reducing power consumption of a constant linear velocity (CL V) disk drive, wherein the disk drive has a head capable of reading data, a head actuator, a disk medium including a spiral storage path and having an outer periphery and being mounted in the disk drive, a clock, a control processor in communication with the clock, a spindle motor for spinning the disk medium at a measurable angular velocity, and a spindle motor control module in communication with the spindle motor to maintain a substantially constant linear velocity of the disk, the method comprising the machine-executed steps of:

(a) determining an activity level of the disk drive;
    (b) referencing a predetermined activity level criterion to determine if the activity level satisfies the activity level criterion; and
    (c) while maintaining the drive at an operational level where the head is enabled to read and write data, issuing a seek signal to the head actuator to displace the head to a track of the disk medium closest in proximity to the outer periphery of the disk medium if the activity level criterion is met.

2. The method of claim 1, further comprising a step of receiving a request to read data from a location of data on the disk following the displacement of the head to the outer periphery of the disk medium, and in response to the request performing a machine-executed step of issuing a seek signal to the head actuator to displace the head from the outer periphery track to a track corresponding to the location of data.

3. The method of claim 1, further comprising the steps of following the displacement of the head to the outer periphery of the disk medium determining whether the activity criterion continues to be met for a predetermined period of time, and if so, performing a machine-executed step of reducing the angular velocity until the spindle motor ceases to spin, thereby further reducing the power consumed by the spindle motor.

4. The method of claim 3, further comprising a step of receiving a request to read data from a location of data on the disk medium following the reduction of the angular velocity until the spindle motor ceases to spin, and in response to the read request performing a machine-executed step of increasing the angular velocity of the spindle motor and issuing a seek signal to the head actuator to displace the head from the outer periphery track to a track corresponding to the location of data.

5. A method of reducing power consumption of a constant linear velocity (CL V) disk drive, wherein the disk drive is a constant linear velocity disk drive which has a head capable of reading data, a head actuator, a disk medium including a spiral storage path and having an outer periphery and being mounted in the disk drive, a clock, a control processor in communication with the clock, a spindle motor for spinning the disk medium at a measurable angular velocity, and a spindle motor control module, the method comprising the machine-executed steps of:
 (a) determining an activity level of the disk drive;
 (b) comparing the activity level of the disk drive to a predetermined activity level reference criteria;
 (c) issuing a seek signal to the head actuator to displace the head to a track of the disk medium closest in proximity to the outer periphery of the disk medium, if the predetermined reference criteria is satisfied; and
 (d) in response to the head being displaced to the outer track of the disk, reducing the angular velocity of the spindle motor while continuing to spin the spindle motor and maintaining the drive at an operational level where the head is enabled to read and write data.

6. The method of claim 5, further comprising a step of receiving a request to read data from a location of data on the disk medium following the displacement of the head to the outer periphery of the disk medium, and in response to the request performing a machine-executed step of issuing a seek signal to the head actuator to displace the head from the outer periphery track to a track corresponding to the location of data.

7. The method of claim 5, further comprising the steps of following the displacement of the head to the outer periphery of the disk medium determining whether the activity criterion continues to be met for a predetermined time, and if so, performing a machine-executed step of issuing a command to the spindle motor control module to reduce the angular velocity until the spindle motor ceases to spin, thereby further reducing the power consumed by the spindle motor.

8. The method of claim 7, further comprising a step of receiving a request to read data from a location of data on the disk medium following the reduction of the angular velocity until the spindle motor ceases to spin, and in response to the request performing a machine-executed step of issuing a command to the spindle control module to increase the angular velocity of the spindle motor and issuing a seek signal to the head actuator to displace the head from the outer periphery track to a track corresponding to a location of data.

9. A method of reducing power consumption of a constant linear velocity (CL V) disk drive, wherein the disk drive is a constant linear velocity disk drive which has a head capable of reading data, a head actuator, a disk medium including a spiral storage path and having an outer periphery and being mounted in the disk drive, a clock, a control processor in communication with the clock, a spindle motor for spinning the disk medium at a measurable angular velocity, and a spindle motor control module, the method comprising the ordered machine-executed steps of:
 (a) determining an activity level of the disk drive;
 (b) comparing the activity level of the disk drive to a predetermined activity level reference criteria;
 (c) issuing a seek signal to the head actuator to displace the head to a track of the disk medium closest in proximity to the outer periphery of the disk medium, if the activity level criteria is met;
 (d) in response to the head being displaced to the outer track of the disk, reducing the angular velocity of the spindle motor while continuing to spin the spindle motor and maintaining the drive at an operational level where the head is enabled to read and write data; and
 (e) reducing the angular velocity until the spindle motor ceases to spin if the activity level criteria continues to be met for a predetermined period of time, thereby further reducing the power consumed by the spindle motor.

10. The method of claim 9, further comprising a step of receiving a request to read data from a location of data on the disk medium following the reduction of the angular velocity until the spindle motor ceases to spin, and in response to the request performing a machine executed step of issuing a command to the spindle motor control module to increase the angular velocity of the spindle motor and issuing a seek signal to the head actuator to displace the head from the outer periphery track to a track corresponding to a location of data.

11. A method of selectively reducing power consumption of a computer memory disk drive while being responsive to a request to read data, wherein the disk drive is a constant linear velocity disk drive which has a head capable of reading data, a head actuator, a disk medium including a spiral storage path and having an outer periphery and being mounted in the disk drive, a clock, a control processor in communication with the clock, a spindle motor for spinning the disk medium at a measurable angular velocity, and a spindle motor control module, the method comprising the machine-executed steps of:
 (a) determining an activity level of the disk drive;
 (b) comparing the activity level of the disk drive to a predetermined activity level reference criteria; and
 (c) in response to determining that the activity level criteria is met, maintaining the drive at an operational level where the head is enabled to read data and while performing further operations comprising:
  (c.1) issuing a seek signal to the head actuator to displace the head to a track of the disk medium closest in proximity to the outer periphery;
  (c.2) in response to displacing the head to the outer periphery, issuing a command to the spindle motor control module to reduce the angular velocity of the spindle motor while continuing to spin the spindle motor; and
  (c.3) following the reduction of the velocity of the spindle motor, issuing a command to the spindle motor control module to increase the angular velocity of the spindle motor if a request to read data is received.

12. A system for reducing power consumption of computer memory disk drive, the system comprising:
 a constant linear velocity (CL V) disk drive adapted to maintain a substantially constant linear velocity of a disk medium having a spiral storage path and mounted in the disk drive, wherein the disk drive further comprises:
a head capable of reading data;
a head actuator;
a disk medium having an outer periphery and being mounted in the disk drive;
a spindle motor for spinning the disk medium at a measurable angular velocity;
a spindle motor control module; and
a power savings module coupled with the disk drive, the power savings module including a processor and a clock and further including machine-executed means for:
(a) determining an activity level of the disk drive;
(b) referencing a predetermined activity level criterion to determine if the activity level satisfies the activity level criterion; and
(c) while maintaining the drive at an operational level where the head is enabled to read and write data, issuing a seek signal to the head actuator to displace the head to a track of the disk medium closest in proximity to the outer periphery of the disk medium if the activity level criterion is met.

13. The system of claim 12, wherein the machine-executed means includes means for responding to a request to read data by issuing a seek signal to the head actuator to displace the head from the outer periphery track to a track corresponding to a location of data, following the displacement of the head to the outer periphery of the disk medium if the activity level criterion is met.

14. The system of claim 12, wherein the machine-executed means includes means for reducing the angular velocity until the spindle motor ceases to spin following the displacement of the head to the outer periphery of the disk medium if the activity level criterion is met, thereby further reducing the power consumed by the spindle motor.

15. The system of claim 14, wherein the machine-executed means includes means for responding to a request to read data by increasing the angular velocity of the spindle motor and issuing a seek signal to the head actuator to displace the head from the outer periphery track to a track corresponding to a location of data, following the displacement of the head to the outer periphery of the disk medium if the activity level criterion is met.

16. An apparatus for reducing power consumption in a constant linear velocity (CL V) disk drive, wherein the disk drive has a head capable of reading data, a head actuator, a disk medium Including a spiral storage path and having an outer periphery and being mounted in the disk drive, a clock, a control processor in communication with the clock, a spindle motor for spinning the disk medium at a measurable angular velocity and maintaining a substantially constant linear velocity, and a spindle motor control module, the apparatus comprising:
discriminator means for determining an activity level of the disk drive; comparative means for comparing the activity level of the disk drive to a predetermined activity level reference criteria to determine if the activity level satisfies the activity level criteria; and
signal issuing means for issuing a seek signal to the head actuator to displace the head to a track of the disk medium closest in proximity to the outer periphery of the disk medium if the activity level criterion is met while maintaining the drive at an operational level where the head is enabled to read and write data.

17. The apparatus of claim 16, wherein the signal issuing means further includes means for issuing a seek signal to the head actuator to displace the head from the outer periphery track to a track corresponding to a location of data, in response to a request to read the data, following the displacement of the head to the outer periphery of the disk medium when the activity level criteria is met.

18. The apparatus of claim 16, including the command issuing means for issuing a command to the spindle control module to reduce the angular velocity until the spindle motor ceases to spin if the activity level criteria continues to be met for a predetermined period of time, thereby further reducing the power consumed by the spindle motor.

19. The apparatus of claim 18, including the command issuing means for issuing a command to the spindle control module to increase the angular velocity of the spindle motor following a reduction of the angular velocity of the spindle motor and means for issuing a seek signal to the head actuator to displace the head from the outer periphery track to a track corresponding to a location of data, in response to a request to read the data, following the displacement of the head to the outer periphery of the disk medium when the activity level criteria is met.

20. A method of reducing power consumption of a constant linear velocity (CL V) disk drive wherein the disk drive has a disk which has a plurality of data tracks including an outermost data track, a head actuator, a head mounted on the head actuator for reading data when the head actuator positions the head on a data track, a variable speed spindle motor which requires increased power with increased angular speed, the spindle motor spinning the disk at a slower speed as the head actuator moves the head toward the outermost data track so that the speed of the spindle motor and power to the spindle motor are at a minimum above zero when the head actuator positions the head over said outermost data track in a position for reading and writing data on said outermost data track and the drive having an operational level where the head is enabled to read and write data, the method comprising the steps of:
detecting a first level of inactivity of the disk drive upon the occurrence of a first predetermined period of inactivity of the disk drive;
in response to detecting said first level of inactivity: (1) actuating the actuator to position the head over the outermost track and (2) reducing the speed of the spindle motor to said minimum above zero so as to reduce power to the spindle to said minimum above zero; and
maintaining the drive at said operational level continuously before, during and after the steps of actuating the actuator to position the head and reducing the speed of the spindle motor.

21. A method as claimed in claim 20 wherein the disk drive includes a clock and a control processor in communication with the clock for measuring the time of inactivity of the disk drive.

22. A method as claimed in claim 20 wherein the disk has a spiral storage path which provides said outermost data track, the outermost data track being a closest data track to an outer periphery of the disk.

23. A method as claimed in claim 22 wherein the disk drive includes a dock and a control processor in communication with the clock for measuring the time of inactivity of the disk drive.

24. A method as claimed in claim 20 further comprising the steps of:
detecting a second level of inactivity of the disk drive upon the occurrence of a second predetermined period of inactivity of the disk drive; and in response to detecting said second level of inactivity reducing the speed of the spindle motor to zero so that the spindle motor ceases to rotate and power to the spindle motor is zero.

25. A method as claimed in claim 24 further comprising the steps of:

after reducing the speed of the spindle motor to zero receiving a data request to read data from a selected data track on the disk; upon receiving the data request: (1) actuating the actuator to position the head over said selected data track containing said data and (2) increasing the speed of the spindle motor so that constant linear velocity of the disk is maintained relative to the head; and maintaining said operational level between said step of actuating the actuator to position the head over the outermost track and said step of actuating the actuator to position the head over the selected data track.

26. A method as claimed in claim 20 further comprising the steps of:

after positioning the head on the outermost data track on the disk where the speed of the disk is at said minimum level above zero receiving a data request to read data from a selected data track on the disk; and upon receiving the data request; (1) actuating the actuator to position the head on said selected data track containing said data and (2) increasing the speed of the spindle motor so that constant linear velocity of the disk is maintained relative to the head.

27. A method as claimed in claim 26 further comprising the steps of:

detecting a second level of inactivity of the disk drive upon the occurrence of a second predetermined period of inactivity of the disk drive; and in response to detecting said second level of inactivity reducing the speed of the spindle motor to zero so that the spindle motor ceases to rotate and power to the spindle motor is zero.

28. A method as claimed in claim 27 further comprising the steps of:

after reducing the speed of the spindle motor to zero receiving a data request to read data from a selected data track on the disk; and upon receiving the data request: (1) actuating the actuator to position the head over said selected data track containing said data and (2) increasing the speed of the spindle motor so that constant linear velocity of the disk is maintained relative to the head.

29. A method as claimed in claim 28 wherein the disk has a spiral storage path which provides said outermost data track, the outermost data track being a closest data track to an outer periphery of the disk.

30. A method as claimed in claim 29 wherein the disk drive includes a clock and a control processor in communication with the clock for measuring the time of inactivity of the disk drive.

* * * * *

UNITED STATES PATENT AND TRADEMARK OFFICE
CERTIFICATE OF CORRECTION

PATENT NO. : 6,512,652 B1  
DATED : January 28, 2003  
INVENTOR(S) : Dwight Quentin Nelson et al.

It is certified that error appears in the above-identified patent and that said Letters Patent is hereby corrected as shown below:

Title page,  
Item [56], References Cited, FOREIGN PATENT DOCUMENT, "JP 60-171672" delete date of "6/1985" and replace with -- 9/1985 --.  
OTHER PUBLICATIONS, delete "hard disk" before "Controller, Patent Abstracts of Japan" and replace with -- Hard Disk --.

Column 10,  
Line 64, insert -- a -- between "consumption of" and "com-".

Column 11,  
Line 50, delete "Including" between "disk medium" and "a spiral storage path" and replace with -- including --.

Column 12,  
Line 60, delete "dock" between "drive includes a" and "and a control processor" and replace with -- clock --.

Column 13,  
Line 26, delete the semi-colon ";" between "data request" and "(1) actuating" and replace with a colon -- : --.

Signed and Sealed this

Twenty-ninth Day of July, 2003

JAMES E. ROGAN  
*Director of the United States Patent and Trademark Office*